Aug. 9, 1932.                R. M. FIELD                1,871,168
                          TAP CHANGING SYSTEM
                          Filed Jan. 18, 1929
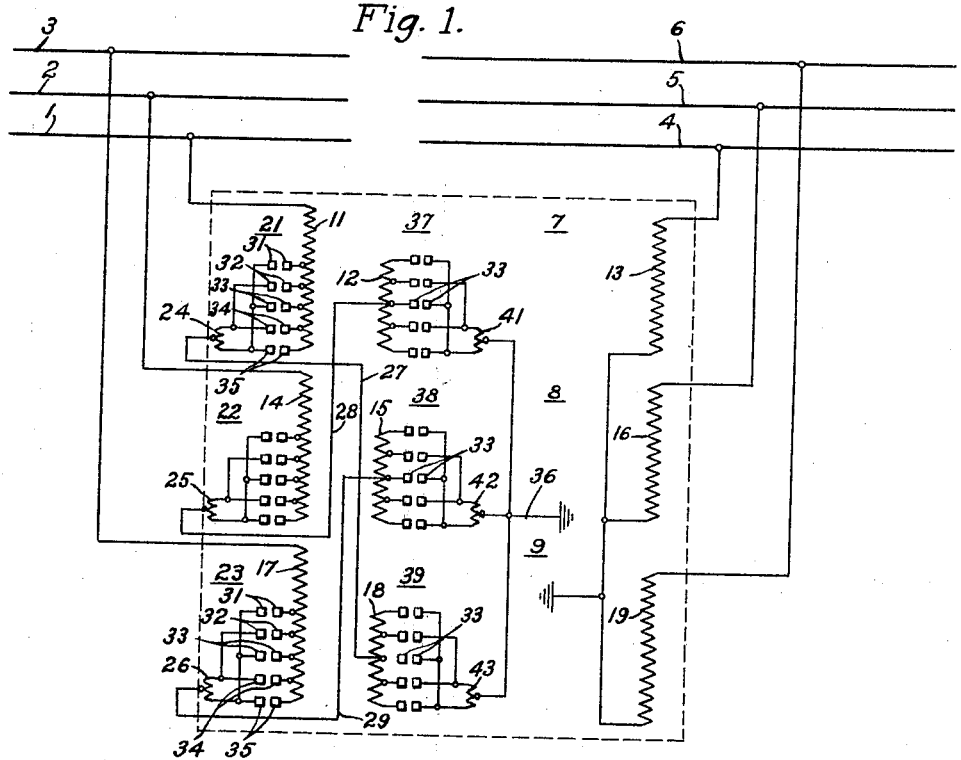
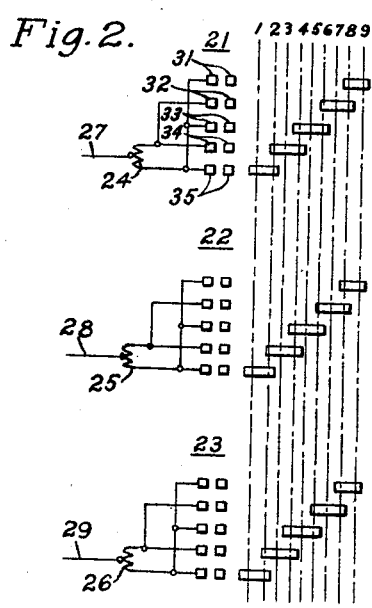
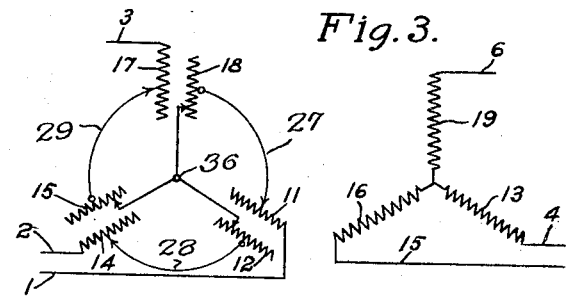
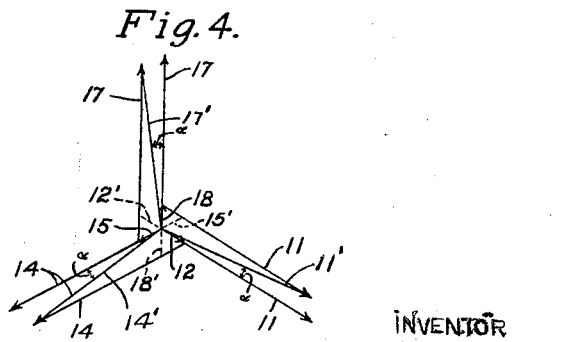
INVENTOR
Russell M. Field.
BY
ATTORNEY Patented Aug. 9, 1932

1,871,168

UNITED STATES PATENT OFFICE

RUSSELL M. FIELD, OF SHARON, PENNSYLVANIA, ASSIGNOR TO WESTINGHOUSE ELECTRIC & MANUFACTURING COMPANY, A CORPORATION OF PENNSYLVANIA

TAP CHANGING SYSTEM

Application filed January 18, 1929. Serial No. 333,339.

My invention relates to tap-changing systems for transformers and more particularly to such systems for controlling the phase angle and the voltage ratio of inter-connected power lines without removing load from the transformers.

It often occurs, when it is desired to inter-connect two power lines, that there is a phase angle between the voltages of the two systems, and, for this reason, it is necessary to introduce means for bringing the phase position of the two voltages together, that is, to vary the phase position of the voltage of one system to correspond to that of the other. During normal operation, little change in the phase position of one power circuit relative to the other occurs, but, under certain conditions of operation, the phase angle of the voltage of one system may vary with respect to that of the other system, and it is then desirable to correspondingly change the phase position of the voltage in one of the systems to correspond to that of the other system.

It is also desirable, when connecting two power circuits, that the voltage ratio of the interconnecting transformer shall correspond to the normal voltage ratio of the power lines being connected and to provide means for changing the voltage ratio of transformation as the voltages of the two systems vary.

I have provided a transformer system for connecting two power circuits composed of units having three windings. Two of the windings of each unit are inductively related and are connected, respectively, to the two power lines, and one of these is provided with tap connections and with means for changing the connections to the windings to vary the voltage ratio of transformation.

It is preferable to connect the windings provided with tap-changing mechanisms in star relation and to vary the tap connections on the windings near the neutral point of the star. The third or auxiliary winding of each unit is connected between the neutral point of the star and the tap-changing mechanism of the main transformer winding for the purpose of varying the phase angle of the voltages in the windings of the transformer connected to the two power circuits. To accomplish this result, the auxiliary winding of one transformer unit is connected in series with the tap-changing winding of an adjacent unit. The auxiliary winding is itself provided with tap-changing mechanism in order that the degree of change of phase angle may be varied.

An object of my invention is to provide a tap-changing system for varying the voltage ratio and the phase angle between the voltages of two power circuits wherein transformers of the multiple-winding type are used to inter-connect power circuits, thus avoiding any direct connection between the conductors of the two circuits.

Other objects of my invention will become apparent to those skilled in the art when the following description is considered in connection with the accompanying drawing, in which:

Figure 1 is a diagrammatic view of apparatus and circuits arranged in accordance with my invention.

Fig. 2 is a controller development showing the consequence of operation of the several switches of one set of tap-changing mechanism.

Fig. 3 is a diagrammatic view of the transformer windings shown in Fig. 1, representing the windings as arranged in accordance with the relations of the voltages of the several windings, and Fig. 4 is a vector diagram representing the direction and magnitude of the voltages in the several transformer windings.

Referring to the drawing, two power circuits represented by conductors 1, 2 and 3, and 4, 5 and 6 are connected together through a bank of transformers 7, 8 and 9, each having three windings 11, 12, 13; 14, 15, 16 and 17, 18 and 19, respectively. The three windings 13, 16 and 19 of the three transformer groups are connected to the conductors 4, 5 and 6, respectively, representing one power line, and the three windings 11, 14 and 17 are connected, respectively, to the conductors 1, 2 and 3 of the other power line.

The windings 11, 14 and 17 are provided with tap connections on the ends of the windings removed from the connection to the power-line conductors and with tap-changing switches 21, 22 and 23, respectively, for varying the effective number of turns of the transformer winding connected to the power circuit, thereby to vary the ratio of transformation between the two circuits.

Each group of tap-changing switches 21, 22 and 23 is connected, through preventive auto transformers 24, 25 and 26, respectively, and conductors 27, 28 and 29, with an intermediate or middle point on the auxiliary windings 12, 15 and 18, respectively. Each series of tap-changing switches 21, 22 and 23 is provided with cooperating pairs of switch contact members 31, 32, 33, 34 and 35, the corresponding pairs of contact members of the several switch groups being operated simultaneously as shown in Fig. 2 of the drawing, illustrating the positions of the switches with respect to the several controller positions 1 to 9, inclusive.

It will be noted from examining the sequence chart of Fig. 2, that nine tap connections may be made from the operation of the five switches. For example, in controller position 1, the conductor 27 is connected to the transformer winding 11 through the pair of switch contact members 35 and one-half of the preventive auto transformer winding 24. In controller position No. 2, both pairs of cooperating contact members 34 and 35 are closed, and the conductor 27 has a potential equivalent to a point on the transformer winding midway between the taps connecting the contact members 34 and 35. In controller position 3, the contact members 35 are disengaged and the conductor 27 is connected to the tap connection corresponding to the contact members 34. This sequence of operation continues throughout the range of control effective by the number of cooperating contact members and transformer taps, provided the several switch groups 21, 22 and 23 are similarly operated, so that the connections of the conductors 28 and 29 to the transformer windings 14 and 17, respectively, will, at all times, correspond to the connections of the conductor 27 to the winding 11.

The auxiliary windings 12, 15 and 18 are connected together and may be connected to a common ground 36 through a series of controller-switch groups 37, 38 and 39 and the corresponding preventive auto transformers 41, 42 and 43 that are similar in construction and operation to the tap-changing switches 21, 22 and 23.

The operation of the tap-changing mechanisms actuating the groups of switches 21, 22 and 23 varies the number of turns of the windings 11, 14 and 17 that are connected in circuit between the power conductors 1, 2 and 3, respectively, and the neutral connection of these windings, thereby varying the voltage ratio of transformation between the two power circuits. The windings 12, 15 and 18 each produce voltage vectors that are in phase with their inductively related windings 11, 14 and 17, respectively, and are so connected as to produce voltage vectors that are 60 degrees or 120 degrees out of phase with the windings connected in series relation with them and are, therefore, effective primarily to produce changes in the phase-angle relation of the voltages of the transformer windings connected to the two power systems.

The relation of the windings and the voltage vectors of the several windings are clearly shown in Figs. 3 and 4 of the drawing, the vectors 11, 14 and 17 in Fig. 4 representing the voltages of the corrrespondingly numbered windings. The value of these voltages is varied by the operation of the tap-changing switches 21, 22 and 23, thus correspondingly varying the voltage per turn of the windings 13, 16 and 19 (if 21, 22 and 23 are considered as the primary and 13, 16 and 19 as the secondary winding of the transformer) or the voltage ratio of transformation between the two lines. The voltage vectors 12, 15 and 18 are added vectorially to the voltage of the windings 11, 14 and 17, respectively. These vectors may be taken in one of two directions, depending upon which side of the middle point of the transformer windings 12, 15 and 18 the connection to the neutral point 36 is made. The lengths of these vectors are varied by varying the connection to the windings by operation of the switch groups 37, 38 and 39.

As shown in Fig. 4, the solid-line vectors 18 and 11, 12 and 14 and 15 and 17 are respectively added, giving the resultant vectors 11′, 14′ and 17′, respectively, which correspond to the voltages induced in the correspondingly numbered windings, between the lines 1, 2 and 3, respectively, and the neutral point.

Since the windings 13, 16 and 19 are inductively connected to the windings 11, 14 and 17, respectively, the voltage vectors 11 and 13, 14 and 16, and 17 and 19 will be in phase, but the voltage to neutral 11′ and 13, 14′ and 16, and 17′ and 19, or the voltages between lines 1 and 4, 2 and 5, and 3 and 6 will be out of phase by the angle alpha.

Thus, the power line 1, 2 and 3, which is out of phase, by the angle alpha, with the power line 4, 5 and 6, may be connected to it without causing a flow of power between the two, as would be the case with no means of phase-angle control. Similarly, by connecting two lines which are in phase, a flow of power may be caused by the proper adjustment of the switch groups, 37, 38 and 39.

It will be noted that the vectors added in Fig. 4 of the drawing are 120 degrees out of phase. The dotted-line representation of the voltages 12, 15 and 18 represented by the numerals 12′, 15′ and 18′, respectively, are 180 degrees out of phase with the solid-line voltages and are 60 degrees out of phase with the voltage vectors 11, 14 and 17 to which they may be vectorially added. If the voltages of the transformer windings 12, 15 and 18 are in the directions indicated by the dotted-line vectors and are vectorially added to the corresponding main transformer windings, they will produce a phase-angle change in the opposite direction; that is to say, if the voltage 15' is added to the vector 17, the voltage 17' will be on the opposite side of the vector 17 from the position shown in the drawing.

The voltage vectors 12, 15 and 18 will become zero when the tap-changing switch groups 37, 38 and 39 are in the position No. 5 of Fig. 2, that is, such a position that the cooperating pairs of contact members 33 only are closed, thus connecting the conductors 27, 28 and 29 directly to the ground 36. The voltage vectors of the windings 12, 15 and 18 increase in the one or in the other direction as the switches 37, 38 and 39 are actuated in the one or in the other direction from position 5 shown in Fig. 2.

It will be noted that the tap-changing switches of the windings 11, 14 and 17 are connected to the ends of those windings nearest to the neutral point, thereby requiring a minimum of insulation between the switch contacts and ground.

Since many changes may be made in the apparatus and circuits described without departing from the spirit of my invention, I do not wish to be limited otherwise than by the scope of the appended claims.

I claim as my invention:

1. In a transformer system, a group of windings adapted to be connected to one power circuit, and a corresponding group of windings adapted to be connected to a second power circuit, means for varying the voltage ratio between said groups of windings comprising tap-changing switches for the windings of one group, and means for varying the phase displacement between the voltages of the cooperating pairs of said windings comprising auxiliary windings each being inductively related to a winding of one of said groups of windings and connected in series-circuit relation with the next succeeding winding of said group.

2. In a transformer system, a plurality of cooperating pairs of windings, corresponding windings of the several pairs forming groups of windings adapted to be connected to different power circuits, an auxiliary winding associated with, and inductively related to, each cooperating pair of windings, the windings of one of said groups being provided with tap connections and tap connections for said auxiliary windings, means for similarly changing the tap connections to the windings of said groups for varying the voltage ratio between the cooperating pairs of windings, and means for similarly varying the tap connections to said auxiliary windings for changing the phase-angle displacement between the voltages of the cooperating pairs of windings.

3. In a polyphase transformed system, a plurality of inductively related units corresponding to the number of phases of the system, each unit comprising three windings, a plurality of tap connections for each of two windings of each unit, means for connecting the first winding of each unit to the second winding of the next adjacent unit, and means for varying the tap connections to the first and second windings of said units to vary the voltage ratio and phase-angle relation between the voltages of said first and third windings of said units.

4. In combination, two power circuits, transformers having cooperating pairs of windings connected, respectively, to said two power circuits, the windings connected to one of said power circuits being connected in star relation to a common neutral point, means for varying the effective number of turns of said windings, and means for introducing voltages into the connections between the windings and said neutral point that are out of phase with the voltages of said windings, said means comprising a plurality of auxiliary windings, each being inductively related to one of the first named windings and connected to a winding of the next succeeding phase, and means for varying the voltages introduced by the auxiliary windings.

5. In combination, two power circuits, transformers having cooperating pairs of windings connected, respectively, to said two power circuits, the windings connected to one of said power circuits being connected in star relation to a common neutral point, means for varying the effective number of turns of said windings without removing the load therefrom, auxiliary windings each inductively related to one of said first named windings and connected in series relation between another of said windings and said neutral point for producing voltages that are out of phase with the voltages of the windings with which they are connected, and means for varying the effective number of turns of said auxiliary windings.

In testimony whereof, I have hereunto subscribed my name this 9th day of January, 1929.

RUSSELL M. FIELD.